United States Patent
Gonzalvo et al.

(10) Patent No.: US 8,661,535 B2
(45) Date of Patent: Feb. 25, 2014

(54) METHOD FOR MAKING SECURE THE EXECUTION OF AN INTERMEDIATE LANGUAGE SOFTWARE CODE IN A PORTABLE DEVICE

(75) Inventors: Benoit Gonzalvo, Gemenos (FR); Pierre Girard, La Destrousse (FR)

(73) Assignee: Gemalto SA, Meudon (FR)

( * ) Notice: Subject to any disclaimer, the term of this patent is extended or adjusted under 35 U.S.C. 154(b) by 1150 days.

(21) Appl. No.: 12/086,250

(22) PCT Filed: Dec. 12, 2006

(86) PCT No.: PCT/EP2006/069623
§ 371 (c)(1),
(2), (4) Date: Jun. 9, 2008

(87) PCT Pub. No.: WO2007/068706
PCT Pub. Date: Jun. 21, 2007

(65) Prior Publication Data
US 2009/0165149 A1    Jun. 25, 2009

(30) Foreign Application Priority Data
Dec. 13, 2005    (FR) ...................................... 05 12627

(51) Int. Cl.
*G06F 21/00* (2013.01)
(52) U.S. Cl.
USPC ................................. 726/22; 726/26; 713/187
(58) Field of Classification Search
None
See application file for complete search history.

(56) References Cited

U.S. PATENT DOCUMENTS

| | | | | |
|---|---|---|---|---|
| 6,477,702 | B1 * | 11/2002 | Yellin et al. | 717/126 |
| 6,760,907 | B2 * | 7/2004 | Shaylor | 717/158 |
| 7,051,343 | B2 * | 5/2006 | Bracha et al. | 719/332 |
| 7,080,363 | B2 * | 7/2006 | Yellin et al. | 717/139 |
| 2002/0066004 | A1 * | 5/2002 | Nevill et al. | 712/209 |
| 2003/0126590 | A1 * | 7/2003 | Burrows et al. | 717/154 |
| 2003/0135844 | A1 * | 7/2003 | Yellin et al. | 717/126 |
| 2004/0153827 | A1 * | 8/2004 | Schwabe | 714/38 |
| 2004/0186979 | A1 | 9/2004 | Janke et al. | |
| 2004/0255146 | A1 * | 12/2004 | Asher et al. | 713/200 |
| 2008/0232582 | A1 * | 9/2008 | Chevallier-Mames et al. | 380/44 |

OTHER PUBLICATIONS

IEEE, The Authoritative Dictionary of IEEE Standards Terms, 7th ed., Standards Information Network, IEEE Press, 2000, 4 pgs. 1-4.*
PCT/ISA/210.
PCT/ISA/237.

\* cited by examiner

*Primary Examiner* — Jeffery Williams
(74) *Attorney, Agent, or Firm* — Buchanan Ingersoll & Rooney PC

(57) ABSTRACT

A method for executing an application compiled in intermediate code on a portable digital appliance equipped with a virtual executing machine for interpreting the intermediate code. The method includes a step of applying a secure execution mode wherein the interpretation of the intermediate code by the virtual machine includes the following steps: for each item of data the code handled for execution of an arithmetic and/or logical operation defined by the code, generating control data, related to the data of the code via a predetermined function; in parallel with the execution of the operation, executing a control operation related to the operation defined by the code via the predetermined function, and acting on the control data.

13 Claims, 1 Drawing Sheet

METHOD FOR MAKING SECURE THE EXECUTION OF AN INTERMEDIATE LANGUAGE SOFTWARE CODE IN A PORTABLE DEVICE

BACKGROUND OF THE INVENTION

1. Field of the Invention

The present invention relates to software and execution environments incorporated in a portable digital device, and in particular relates to a method for making secure the execution of an application compiled in intermediate language against fault attacks, during the execution thereof on a portable digital device equipped with a virtual executing machine.

2. Description of the Related Art

A portable device will hereinbelow mean any portable digital device such as a portable computer but also any device equipped with a microcontroller which combines a processor and memories, such as a chip card.

The desire to create interoperable applications has led to the development of intermediate programming languages. The main aim of these languages is therefore to make their software independent of the hardware on which they have to be executed. The software items are then designed to be executed in the form of an intermediate code which is independent of the underlying architecture.

The programmers are thus generally released from the constraints associated with specific hardware. Intermediate languages such as Java bytecode, obtained after compilation from the Java source language, have thus expanded greatly as a result. Mention may also be made of the intermediate language MSIL ("Microsoft intermediate language") which is used in the context of the .Net or DotNet (registered trademark) environment, obtained after compilation from various possible source languages such as C++ or C#.

The intermediate code therefore conventionally corresponds to a compiled form of the software. This software, compiled in Java, or in other intermediate languages, such as .Net, cannot be executed as such by the processor of the device on which it is desired to execute a program compiled in the form of intermediate code. It is necessary to introduce a software layer which has the main aim of interpreting the intermediate code into instructions which can be executed by the processor of the host device. This software layer is referred to as a "virtual machine". For example, the JAVA virtual machine makes it possible to execute a Java software item on a given platform on which it is implemented.

A Java software item is conventionally distributed in the form of a set of modules consisting of .class files, corresponding to a compiled form of the software. Each compiled file corresponds to a data structure of the class type and as such comprises the information relating to this class, namely the description of the elements of the class (its constants, its fields, its methods), the description of the elements used by the class and defined in other classes (fields and methods), the code of the methods of the class in the form of instructions (bytecode) which can be interpreted by the interpreter of the Java virtual machine.

In a simplified manner, a .class file has for example the following structure:

```
ClassFile {
    Field_list;      //Description of the fields of
    the class
    Method_list;     //Methods of this class
```

(including their bytecode, that is to say their instructions which can be interpreted by the interpreter of the virtual machine)
}

Thus, by way of example, in the context of an electronic purse Java application, it is possible to define a class named "Purse" with its field "balance" and its method "decrementBalance( )". The .class file could have the following structure:

```
Public class Purse {
    private int balance = 0;
    public void decrementBalance( ){
        this.balance = this.balance - 1;
    }
}
```

Thus, according to this example, the execution of the method of the class "Purse" consists in subtracting the value 1 from the current instance of the balance field.

The execution of the corresponding Java software is carried out by the Java virtual machine installed on the portable device.

This virtual machine converts the information of the ClassFile into data structures in the working memory which are specific to the virtual machine and which allow this virtual machine to interpret and execute the software.

To do this, the virtual machine has a specific set of instructions, each instruction being coded on one or more octets. The set of instructions of the virtual machine comprises for example a certain number of conventional instructions such as arithmetic operations, logical operations and jumps. The virtual machine typically has an execution stack which uses local variables numbered from zero, but may also use registers.

At present, the execution of an application by the virtual machine is not entirely secure, in particular with regard to attacks in general and especially fault attacks. For instance, the sensitive value in the above example, represented by the "balance" field, may be modified following the injection of a fault during the manipulation of this value for the interpretation of the method of updating this field by the virtual machine, leading to the setting of a final value in the stack for the balance field which is different from that normally expected, for example the balance field may be forced to its maximum value.

One known manner of protecting applications in intermediate code against fault attacks during their execution by the virtual machine on the card consists in adding a redundant checksum code within the actual code of the application that is to be executed.

For example, in order to protect the aforementioned code, it is possible to use in Java, as a checksum data item, the complemented value of the balance field, denoted ~balance, which returns the ones complement of the binary balance value, and to update this checksum data item value in parallel with the updating of the balance value during the execution of the method by the virtual machine. A comparison of the result of the two update calculations carried out in parallel, on the one hand for the balance field and on the other hand for the complemented ~balance field, then makes it possible to verify the integrity of the data items that have been used to carry out the calculations. The Java code modified as a consequence then has the following structure:

```
public class Purse {
    private int balance = 0;
    private int balChecsum = ~balance;    // = 0xFFFFFFFF
    public void decrementBalance( ){
        this.balance = this.balance - 1;
        this.balChecsum = this.balChecsum + 1;
    }
}
```

The disadvantage or such a method for mating secure the execution of Java code is that it consumes a great deal of resources and calculation time, which is penalising in restricted environments such as chip cards.

Furthermore, the developers of Java applications (or applications in another intermediate language) then have to develop the code of their application while taking account of this constraint in order to protect the sensitive parts of the code.

SUMMARY OF THE INVENTION

The invention aims to overcome one or more of these disadvantages. The invention thus relates to a method for executing an application compiled in intermediate code on a portable digital device equipped with a virtual executing machine for interpreting the intermediate code, characterised in that it comprises a step of applying a secure execution mode in which the interpretation of the intermediate code by the virtual machine comprises the following steps:

- for each data item of the code manipulated for the execution of an arithmetic and/or logical operation defined by the code, generating a checksum data item which is linked to said data item of the code via a predetermined function,
- in parallel with the execution of said operation, executing a checksum operation which is linked to said operation defined by the code via said predetermined function and which acts on the checksum data item(s).

Preferably, the method furthermore comprises a step consisting in verifying the integrity of the calculations carried out by comparing the results obtained by said operations.

Advantageously, the verification step consists in verifying that the results obtained by said operations, respectively the operation defined by the code and the checksum operation, are linked by the predetermined function.

According to a first embodiment, the method comprises the use by the virtual machine of two independent data structures which can be manipulated by said virtual machine, respectively a data structure dedicated to the manipulation of the data item(s) of the code for the execution of the operation defined by the code and a data structure dedicated to the manipulation of the corresponding checksum data item(s) for the execution of the corresponding checksum operation.

Preferably, the data structures used by the virtual machine according to this first embodiment are organised as a stack.

In one variant, the data structures used by the virtual machine according to this first embodiment are organised as registers.

According to a second embodiment, the method comprises the use by the virtual machine of a single data structure for the manipulation, on the one hand, of the data item(s) of the code for the execution of the operation defined by the code and, on the other hand, of the corresponding checksum data item(s) for the execution of the corresponding checksum operation.

Preferably, the single data structure used by the virtual machine is organised as a stack.

Advantageously, the predetermined function used defines a group morphism.

Preferably, the secure execution mode is applied continually.

According to one variant, the secure execution mode is applied randomly.

According to another variant, the secure execution mode is applied upon detection of a particular condition. Preferably, the condition for application of the secure execution mode is a function of the interpretation of part of the code.

According to one embodiment, the digital device is a chip card which incorporates a virtual machine of the Java or DotNet type.

The invention also relates to a virtual machine for executing an application compiled in intermediate code on a portable digital device, characterised in that it can be stored in a non-volatile memory of the device and is able to implement the method as has just been described above.

The invention also relates to a portable digital device comprising a non-volatile memory which stores the virtual machine according to the invention.

According to one embodiment, this device is a chip card.

Other features and advantages of the invention will become clearly apparent on reading the description which is given by way of non-limiting example and with reference to the appended drawing, in which:

DETAILED DESCRIPTION OF THE INVENTION

Figure 1:
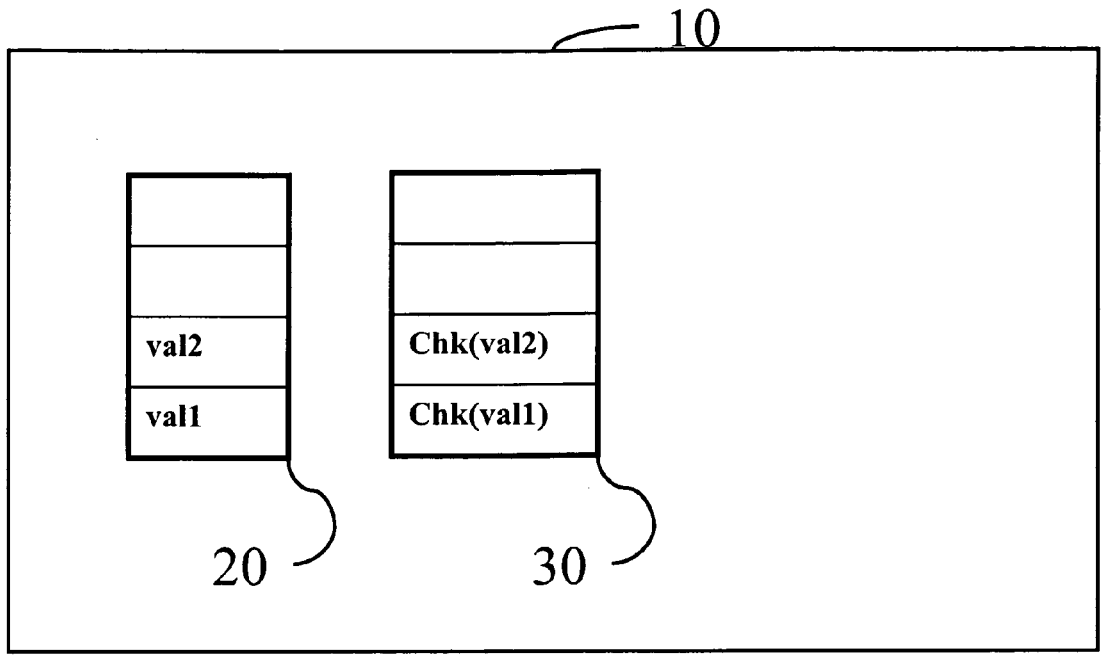
FIGS. 1 and 2 show a preferred embodiment of the invention for the execution, in secure mode, of an application in intermediate code.

The invention therefore proposes to make secure the execution of an application compiled in intermediate code on a portable digital device equipped with a virtual executing machine for interpreting the code of the application.

According to a first embodiment, the method for making secure according to the invention is implemented on a digital device, for example a chip card 10, on which a stack-type virtual machine is installed. The execution stack 20 of the virtual machine is formed of a data structure via which the data items of the intermediate code of the application can be manipulated by the virtual machine.

The principle of the invention then consists in adding to the conventional stack-type virtual machine a security stack 30, which reproduces in parallel the calculations carried out on the normal execution stack so as to check the integrity of the operations taking place on the normal execution stack. Thus, according to the invention, any code acting on a data item considered to be sensitive must generate an action both on the normal execution stack and on the security stack.

To this end, the interpretation of the intermediate code of the application by the virtual machine has to be modified so as to propagate the operations defined by the code on the normal stack and on the security stack. However, according to one feature of the invention, the data items manipulated via the security stack for the execution of an operation defined by the code in parallel with the execution of this operation on the normal execution stack are not the data items of the code identical to those processed on the normal stack.

More specifically, each time that a data item, denoted val, is placed on the normal execution stack, a corresponding checksum data item, denoted Chk(val), is generated and is added to the security stack. The data item Chk(val) is intended to be linked to the data item val via a predetermined function Chk. Furthermore, each time that an arithmetic and/or logical operation is executed using the data item of the code val on the execution stack, a corresponding checksum operation is executed on the security stack using the data item Chk(val).

The benefit of the security stack for the virtual machine is thus to be able to check at any moment in time the integrity of the data item(s) val that it manipulates on the normal execution stack during the execution of a sensitive operation, by checking that if the data item val is placed on the execution stack, then the corresponding checksum data item Chk(val) is placed on the security stack.

To this end, the data items of the code and the corresponding checksum data items are thus linked to one another via a predetermined checksum function, having particular mathematical properties as explained below.

For instance, let V be the space for values on registers having a length s. For registers having a length of 32 bits, this gives:

$$V=[-2147483648, 2147483647]=[-2^{31}, 2^{31}-1]$$

Let O be the set V, with the following conventional logical and arithmetic operations $(+, -, *, /, \&, |)$.

Let F be the set V with the set of operations symbolised as follows $(\boldsymbol{+}, \boxtimes, \odot, \blacklozenge, \square, \bigcirc)$.

The checksum function Chk according to the invention can then be described as follows:

Chk: O - - - →F, so that, for any operation op in the set $(+, -, *, /, \&, |)$, there is a corresponding operation cop in the set $(\boldsymbol{+}, \boxtimes, \odot, \blacklozenge, \square, \bigcirc)$ such that:

$$Chk(a\,op\,b) = Chk(a)\,cop\,Chk(b)$$

For example, in the context of the Java language, the function ~ described above of the ones complement can be written as a particular case of the function Chk as follows:

$$\sim: (V, (+, -, *, /, \&, |)) \text{ - - - } \rightarrow (V, (\boldsymbol{+}, \boxtimes, \odot, \blacklozenge, \square, \bigcirc)) | a \text{ - - - } \rightarrow \sim a$$

where $$\sim(a+b) = \sim a \boldsymbol{+} \sim b = \sim a + \sim b + 1$$

$$\sim(a-b) = \sim a \boxtimes \sim b = \sim a - \sim b - 1$$

Mathematically, the checksum function Chk may be defined as a group morphism from the space O to the space F, respecting all of the operations in F.

It can thus be seen that, for any logical or arithmetic operation acting on one or more data items in the space V, which is the conventional arithmetic space of current virtual machines, it is possible to find an equivalent calculation using the function Chk as defined, using an operator cop linked to the operator op used in the first calculation via the function Chk, and acting on one or more of the so-called checksum data items, linked to the data items used in the first calculation via the function Chk.

FIG. 1 shows an example of execution of a given intermediate code on the normal execution stack and on the security stack according to the principles discussed above.

Let the arithmetic operation defined by the intermediate code consist in adding two integers val1 and val2 previously placed in the normal stack 20. The corresponding checksum data items Chk(val1) and Chk(val2) are then generated so as to be placed in the security stack 30. The data items val1 and val2 are then popped from the normal execution stack 20 for the execution of the arithmetic operation+defined by the code, whereas the corresponding checksum data items Chk(val1) and Chk(val2) are popped from the security stack 30 for the execution in parallel of the operation corresponding to the operation+defined by the code, linked to the latter via the function Chk.

Figure 2:
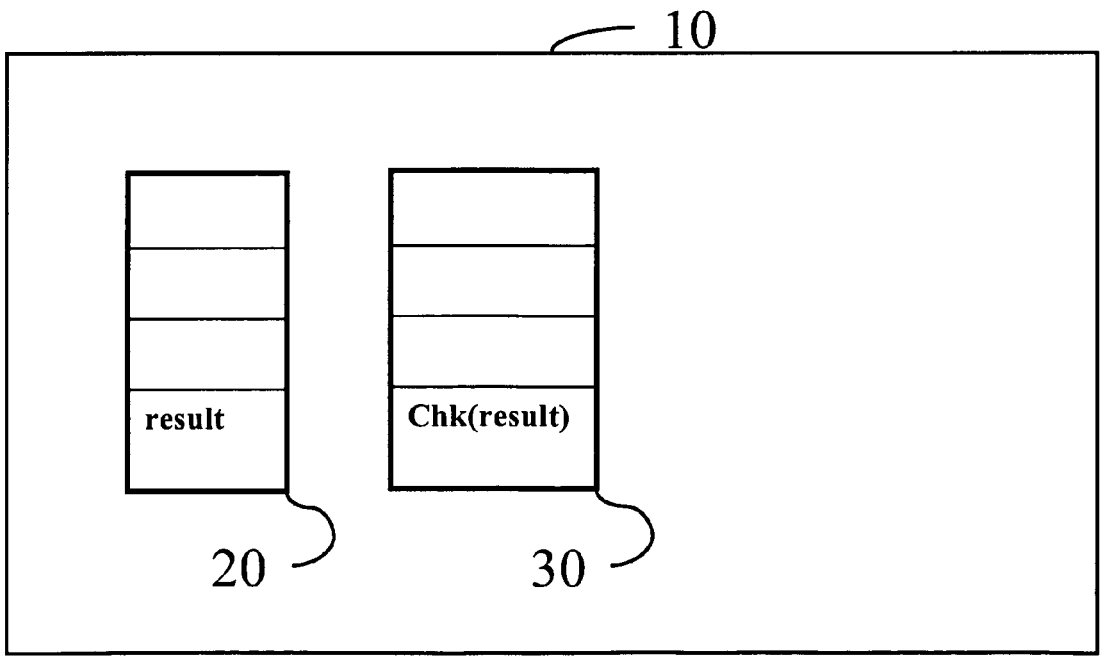

As shown in FIG. 2, the result result=val1+val2 is then placed on the normal stack, whereas the result Chk(result) of the corresponding checksum arithmetic operation is placed on the security stack.

Looking again at the above example in the context of the Java language, in which the checksum function Chk may be defined by the function ~, the checksum result Chk(result) is ~val1+~val2+1.

In the same way, if a subtraction operation is carried out by the virtual machine, then the corresponding operation is carried out on the security stack. For instance, if the arithmetic operation defined by the intermediate code consists in subtracting the two integers val1 and val2 previously placed in the normal stack 20, the corresponding checksum arithmetic operation is executed in parallel on the security stack 30 by acting on the checksum data items ~val1 and ~val2 and the checksum result Chk(result) of the corresponding checksum arithmetic operation placed on the security stack is ~val1−~val2−1.

The principle of the invention applies to the behaviour of any intermediate code involving arithmetic and/or logical operations.

Thus, by verifying the correspondence between the results on the normal execution stack and on the security stack, which must normally be linked to one another by applying the predefined checksum function Chk, it is possible to verify the integrity of the calculations carried out.

The step of verifying the integrity can be implemented in an optional manner. For instance, it may be deferred, carried out at predefined moments in time or even randomly.

Embodiments other than that described with reference to FIGS. 1 and 2 with the use of two independent stacks by the virtual machine can be envisaged. For instance, according to one variant, the virtual machine uses just one single stack and the information items of the intermediate code and the corresponding checksum information items defined via the predefined function Chk are stacked alternately.

The invention can also be implemented in the context of a register-type virtual machine. In this case, each register of the virtual machine used to store the information items of the intermediate code is matched by a security register dedicated to the storage of the corresponding checksum information items defined from the information items of the code via the predefined function Chk.

Advantageously, the virtual machine can operate in a conventional mode or in a secure mode in which, as described above, the calculations and manipulations of data items are matched by calculations and manipulations in parallel on checksum data items.

According to a first variant, it may be provided for the virtual machine to operate only in the secure mode.

According to another variant, the passage to the secure mode may be applied only at the request of the developer of the application, for example by using a specific API.

According to another variant, the passage to the secure mode may be carried out randomly. For example, it is decided that 30% of the operating time must be in the secure mode and the distribution is random.

Finally, the passage to the secure mode may be carried out upon detection of a condition or of a particular event, for example for the execution of a method of a particular class, for the reading of a particular field, etc.

The invention claimed is:

1. A method for executing an application compiled in intermediate code, on a portable digital device having a processor and a memory that implement a virtual executing machine for interpreting the intermediate code and executing a first set of arithmetic and/or logical operations on data items, comprising:
   storing, in the memory, a second set of operations comprising operations that respectively correspond to each of the arithmetic and/or logical operations in said first set, wherein each operation of the second set is related to its corresponding operation in the first set by a predetermined checksum function;
   generating, by the processor, a checksum item for each of a plurality of data items, based on the predetermined checksum function, and storing the checksum items in memory;
   during execution of the application in the executing machine implemented by the processor and memory, performing the following security procedure for an operation that is carried out on data items:
   a) providing, to the executing machine, at least one data item from said plurality of data items, and operations in said first set that are to be performed on the provided data item;
   b) obtaining, by the executing machine, the stored checksum item corresponding to the data item provided to the executing machine, and operations in said second set that correspond to the operations provided in step (a);
   c) performing, in parallel, by the executing machine, the operations provided in step (a) on the at least one data item provided in step (a), and the operations obtained in step (b) on the stored checksum item obtained in step (b); and
   verifying the integrity of a security procedure at any time during the execution of operations by applying the predetermined checksum function to a result obtained at such time from execution of operations provided in step (a), and determining whether the checksum matches the result obtained at that same time from execution of operations provided in step (b).

2. The method of claim 1, wherein the executing machine employs a first data structure stored in the memory for the data items and a second data structure stored in the memory for the checksum items.

3. The method of claim 2, wherein the first and second data structures are respectively organized as first and second stacks in the memory.

4. The method of claim 2, wherein the first and second data structures are respectively organized as first and second registers in the memory.

5. The method of claim 1, wherein the executing machine employs a single data structure in the memory to store both the data items and the checksum items.

6. The method of claim 5 wherein the data structure is organized as a stack in the memory.

7. The method of claim 1, wherein the verifying step is performed on a random basis.

8. The method of claim 1, wherein the security procedure is performed in response to detection of a predetermined condition.

9. The method of claim 1, wherein the security procedure is performed in response to interpretation of a predetermined portion of the intermediate code.

10. The method of claim 1, wherein the security procedure is performed in a random manner.

11. A virtual machine for executing an application compiled in intermediate code on a portable digital device, wherein said virtual machine is stored in a non-volatile memory of the device and is configured to implement the method according to claim 1.

12. A portable digital device comprising a non-volatile memory which stores the virtual machine according to claim 11.

13. The device according to claim 12, wherein said device is a chip card.

* * * * *